Oct. 14, 1969     C. O. ANDERSON     3,472,428
AUTOMATIC FELTER
Filed Oct. 19, 1966     10 Sheets-Sheet 1
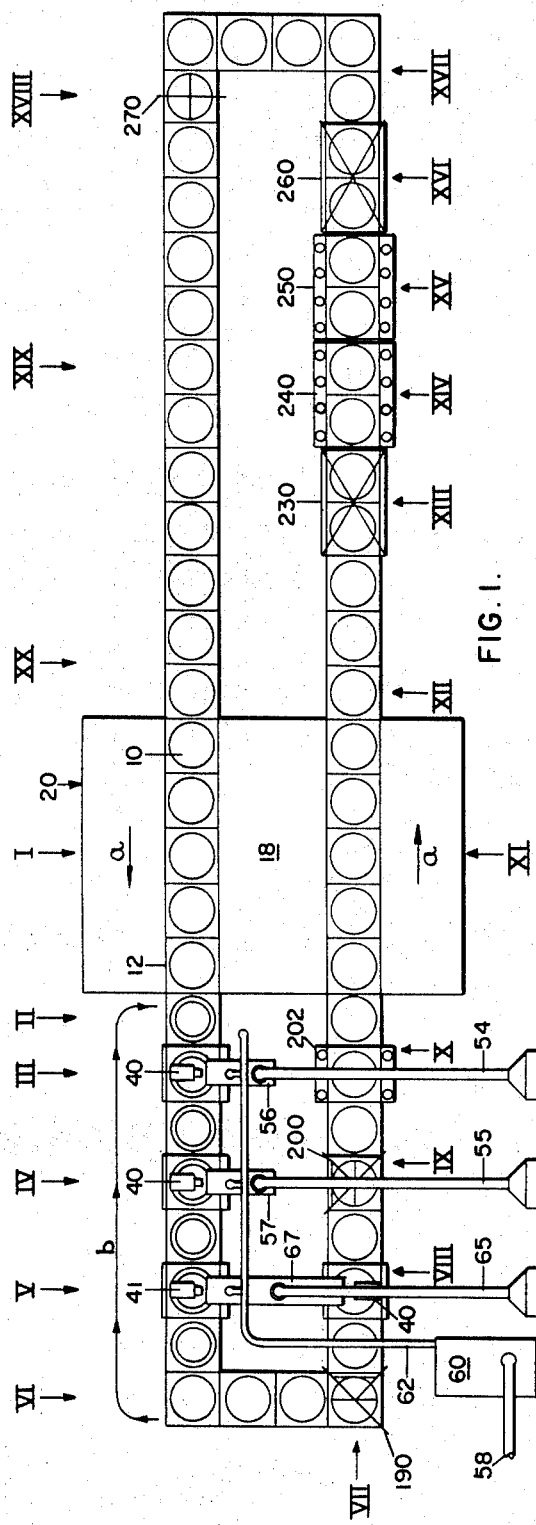
INVENTOR.
CARL O. ANDERSON
BY Kenwood Ross
ATTORNEY.

Oct. 14, 1969   C. O. ANDERSON   3,472,428
AUTOMATIC FELTER

Filed Oct. 19, 1966   10 Sheets-Sheet 5

INVENTOR.
CARL O. ANDERSON
BY *Kenwood Ross*
ATTORNEY.

Oct. 14, 1969  C. O. ANDERSON  3,472,428
AUTOMATIC FELTER
Filed Oct. 19, 1966  10 Sheets-Sheet 6

INVENTOR.
CARL O. ANDERSON
BY Kenwood Ross
ATTORNEY.

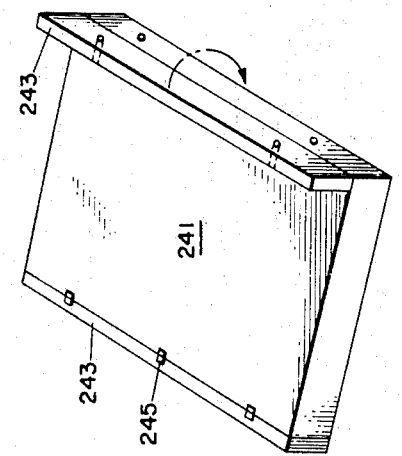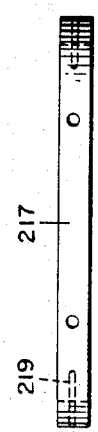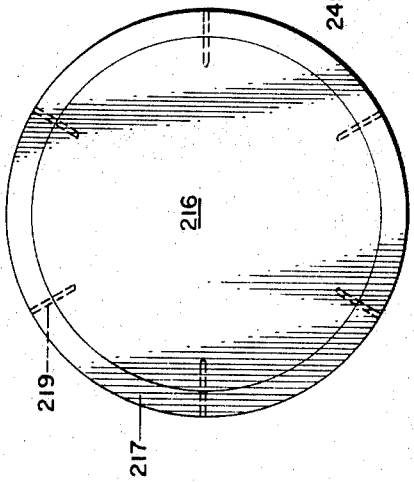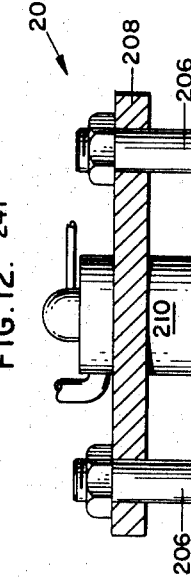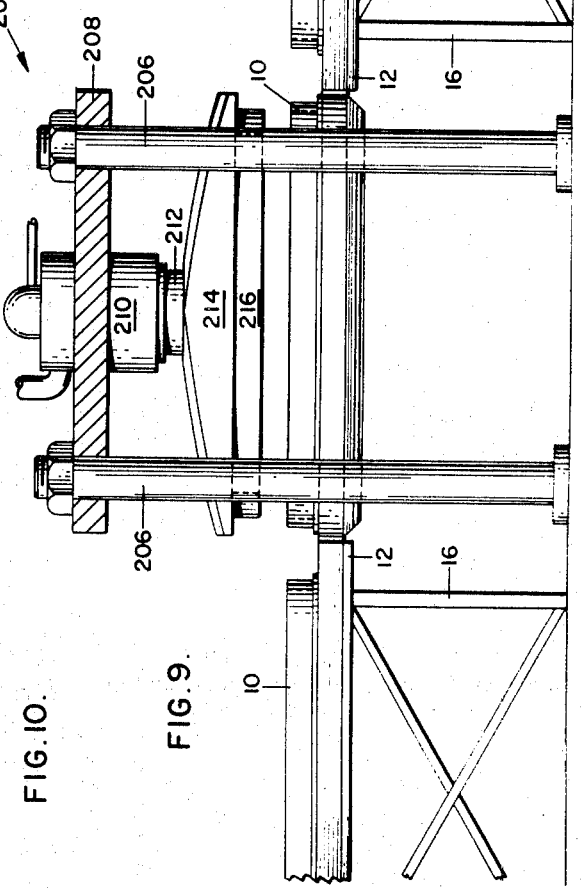

Oct. 14, 1969　　　C. O. ANDERSON　　　3,472,428
AUTOMATIC FELTER

Filed Oct. 19, 1966　　　　　　　　　　10 Sheets-Sheet 8

INVENTOR.
CARL O. ANDERSON.
BY Kenwood Ross
ATTORNEY.

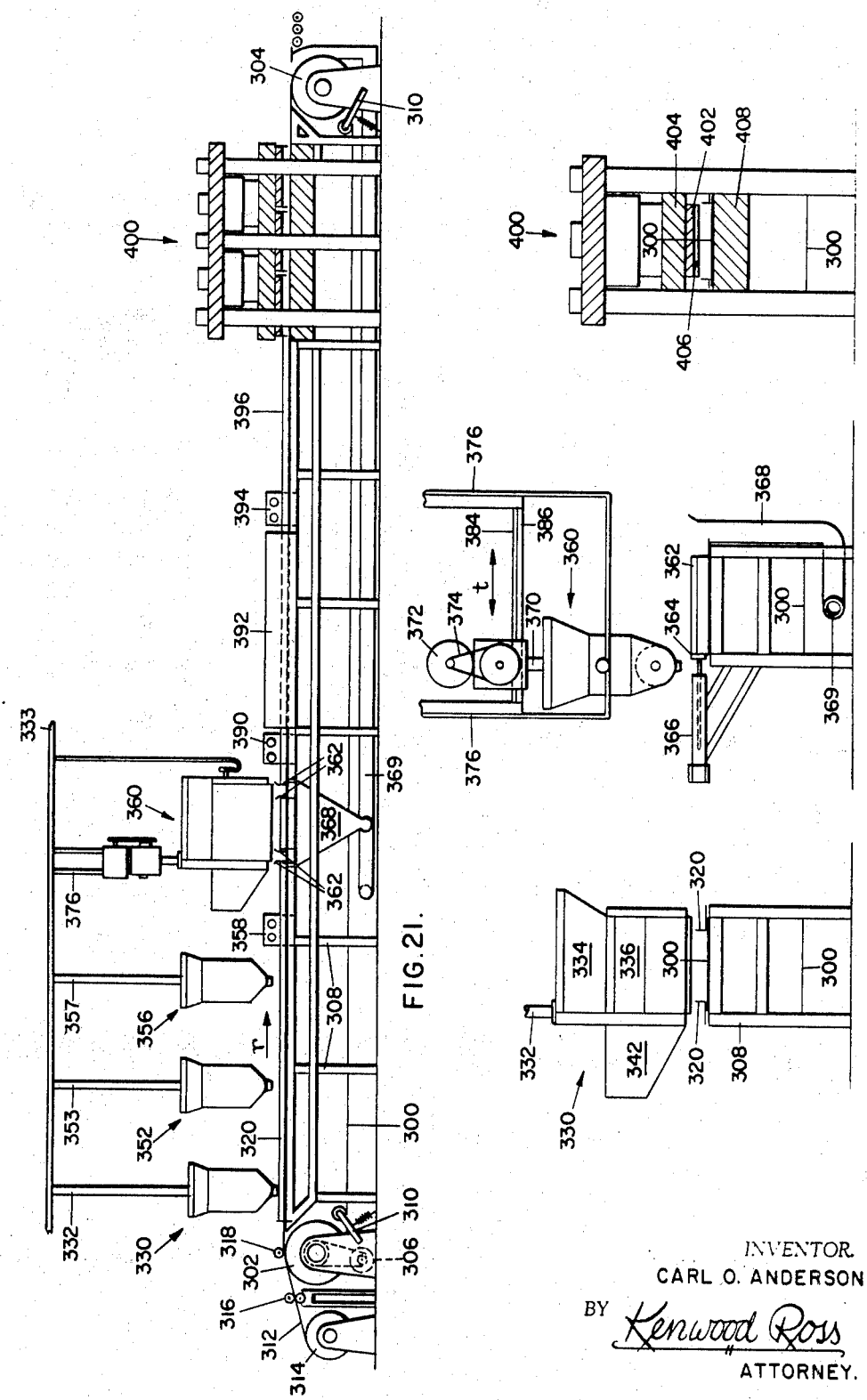

Oct. 14, 1969  C. O. ANDERSON  3,472,428
AUTOMATIC FELTER

Filed Oct. 19, 1966  10 Sheets-Sheet 10

INVENTOR.
CARL O. ANDERSON
BY *Kenwood Ross*
ATTORNEY.

United States Patent Office 3,472,428
Patented Oct. 14, 1969

3,472,428
AUTOMATIC FELTER
Carl O. Anderson, 1 Maple Ridge Drive,
Somers, Conn. 06071
Filed Oct. 19, 1966, Ser. No. 587,849
Int. Cl. G01f 11/10, 11/24
U.S. Cl. 222—168.5
10 Claims

ABSTRACT OF THE DISCLOSURE

Apparatus for uniformly depositing material in zones of a felting receiver zone. Said apparatus includes a driven rotor having sections and a casing which has a horizontal motion over the zones.

---

The invention hereof relates to apparatus for and techniques of felting a mixture of pulverulent particles and a synthetic binder into a form or matrix and compressing same at elevated pressures for the forming of a dense consolidated body.

Stated otherwise, it comprehends a method of producing a coherent structure from such a mixture comprising the steps of entraining a predetermined formulation of the mixture in a felter and discharging or felting a metered quanta of same therefrom into the matrix and subsequently consolidating the material so-deposited into a product of predetermined board-like density and thickness by the judicious application of heat and pressure.

By this invention, structures of either stratified or non-stratified types are envisioned, in the one instance, by the depositing via felters of a plurality of layers of mixes, superimposed one upon another, within a matrix, and in the other instance, by the depositing via a felter of a single layer of a mix.

The invention will be specifically exemplified with respect to the use of particles of wood flour and resin as in the production of consolidated bodies, such as table and desk tops and like articles, although it will be recognized from the outset that such illustrations are merely by way of example, countless other types of particles and cooperant binder being conceivable for use within the spirit and scope of the teachings hereof.

Historically, the conversion of trees into usable products has long been a notoriously wasteful process. Our wood economy has been one of apparent abundance, undoubtedly engendering the prodigious waste. In the relatively recent past, however, the mountainous sawdust piles and the acrid fumes of the wood refuse burners, long the indignant reminders of our apathy and ineptness, have been disappearing as processing techniques have improved and wood residue utilization has increased.

One method involving the utilization of waste materials has been to form same into pressed board, often called composition board, particle board, or hardboard, with chips, shavings, sawdust and sometimes bark constituting the basic raw materials.

Particle board is a term which represents reconstituted wood and loosely defines a large number of products prepared from pressed wood constituents and suitable for a wide range of purposes, the wood material being normally mixed with a resin and pressed at high temperature.

Here, the type and kind of resin, size and type of wood particles, and the nature of the press operation, have been the principal determinants as respects the resultant properties of the finished end products.

With special reference to such specialized articles as table tops, desk tops, and the like, singularized by surfacing with decorative high pressure melamine laminates, their fabrication history reveals revolutionary changes in the more recent past. Originally, the laminate was glued to a pieced solid wood core. Susequently, as techniques advanced, a plywood core came into acceptance as a substitute for the so-called lumber core. Withal, as to either core type, the quality of the finished product was consistently in doubt, unreasonably wide quality variations being the norm. Further, with either core, the resultant edge characteristics have been generally unsatisfactory, dictating additional costly finishing treatments down the avenues of selected solid wood edgings which have been glued as strips, of self edgings with laminates, or of metal or plastic T-moldings, with such latter all too frequently failing to remain in situ.

Here it might be noted that a high pressure melamine laminate can be made to only one quality standard; its bonding to an inferior core serves only to lower the quality of the finished end product.

The first true particleboards began to appear in the early 1950's, although, even then, some were constituted of no more than glue and sawdust. Some of the early types were as suspect as the solid wood or plywood core type products, and edge treatment became even more of an aggravating problem, due essentially to the normally coarse and varied particle structure. Warpage, "telegraphing," delaminating, yes even total product failure, were commonplace, contributing to agonizingly slow fabricator acceptance.

The competitive aspects of the furniture industry, however, were persuasive and some manufacturers saw fit to adopt those early versions of particleboard. The lowered production costs were so significant that the future could not be denied and slowly, as research and development continued, particularly in the area of fine surfaced type boards, table top fabricators commenced to dictate their adoption into industry standards. Still and all, the ultimate was yet beyond reach, high cost edge treatments continuing to be required wherefore, in the case of round table tops at least, core materials still received first priorities.

The impetus continued forward and, eventually, a new type of particleboard began to appear, quite unlike the pioneer glue and sawdust combinations, and constituted by compositions of uniform-sized, fine particles, bonded together with phenolic resins. Of extremely hard density, and with far superior stability and quality, such particleboard formed the basis for a new high pressure laminating technique, sometimes delineated the "one shot" method, allowing fabricators to by-pass for the first time the usual nuisances of glue pots, spreaders, clamps, and cold presses. The "one shot" laminates provided a full thickness table top with a decorative melamine surface heat fused to a high density core, which surface was equal to or better than the heretofore-standard decorative laminates.

For those primarily concerned, the manufacturers of table tops, the "one shot" laminates were closely approching the still-sought ultimate. Nonethless, size limitations dicated certain operating restrictions. Too, with respect to such as a round table top, the continuing problem of edge finish treatment dictated the continued use, with conventional cores, of such as a filling, self-edging, or inserted T-molding. Also, with such fabricating technique, a round table top, utilizing only some 75% of the basic material from which it was formed, failed in the generation of any complete enthusiasm.

Yet, in the very face of it all, round tables came to enjoy an increasing popularity with the commercial marketers and with the purchasing public. Where, at one time, most dinette tables were of rectangular form, a substantial portion of the output was coming to be of round form. Visions of a capture of this growing market gave impetus to the instant invention which exploits the basic advantages of the "one shot" laminating method and reaches therebyond with teachings of significant improvements and advantages thereover.

Herewith is eliminated the aforeitemized 25% waste factor, with respect to basic materials; the need for painstaking tracing and cutting of round core blanks is obviated; and requirements for fillings or self-edgings or T-moldings, wherewith to mask coarse interior core structures, no longer obtain. Herewith too, high-resin-impregnated edges are attainable, thereby to provide edgings nearly equal, characteristicwise, to the melamine top surfaces. More, such edges can be pigmented, thereby to match or complement top surface colorings, with the further finishing operations being rendered unnecessary.

By the process hereof, end products such as table tops are attainable which are suitable, as directly they come from the presses, for ready leg mounting, followed by immediate shipment and sale. Too, highly significant material and labor-saving advantages are realized wherefore any size of round table top can be produced so as to encourage sale thereof at actual square foot prices favorably comparable to those of their square or rectangular counterparts.

The invention comprehends the entrainment of the pulverulent particles of wood flour and hardenable resin and sizing in a felter or felters and the discharge of same therefrom in the form of proportional deposits into a matrix or hollow form which gives origin or foundation to that which is contained therewithin and which is suitable for the shaping of the mass and the consolidation thereof by the judicious application of pressure so as to form a composite end product.

In a first form of the process, the sequential depositing of several mixes from several felters is in the order of, first, forming a base layer mix centrally of the matrix, second, superimposing a core layer mix over the base layer centrally of the matrix, third, forming an edge layer mix in the peripheral area of the matrix circumjacent the base and core layers, and fourth, superimposing a surface layer mix over the core and peripheral edge layers.

In a subform of such first form, the discharging of the several mixes ensues as the respective felters rotate around vertical axes under conditions of automatic synchronization of the speeds of rotation of the felters around said vertical axes and the speeds of rotation of the felting rotor subassemblies of the respective felters.

In another subform of such first form, the discharging of the several mixes ensues as the respective felters reciprocate with respect to the matrix being served with the speed of longitudinal reciprocation of the felters being synchronized with the speeds of rotation of the felting rotor subassemblies of the respective felters.

In still another subform of such first form, the discharging of the several mixes will ensue as both rotating and reciprocating felters, in a single processing line, rotate or reciprocate, as the case may be, with respect to respective matrices being served along the line with the respective rotative speeds of the rotating felters and their felting rotors and the reciprocative speeds of the reciprocating felters and the rotative speeds of their felting rotors being synchronized.

In a second form of the process comprehending the continuous mat technique the sequential depositing of the mixes from the felters is in the order of, first, forming a base layer mix, second, superimposing a core layer mix over the base layer, third, superimposing an edge and surface layer mix over the core layer mix followed by removal of the so-felted base and core and edge and surface layer mixes from end zones at opposite end edges of the deposited mass, and fourth, forming an end layer mix in the cleared end zones, all preliminary to the separating of the end product being formed from the continuous mat, of which it once was a part, as an integral part of the consolidating or compressing phase of the program.

The felter of the invention envisions a means for the discharging of a mixture of pulverulent particles and resin and broadly comprehends a rotor casing defining inlet and outlet openings, a feed hopper opening to the top of the casing, and a discharge chute opening to the bottom of said casing, all cooperant with a driven rotor shaft mounted for rotation coaxially within said casing and including a plurality of axially-aligned rotor segments each having a plug sleeved upon the shaft and a plurality of radial outwardly-extending pocket walls in spaced relation around the plug circumference. The side walls of the casing are such that, in all angular positions of rotation of the rotor, direct communication between the hopper and discharge chute is precluded by the rotor. The pocket walls of the rotor segments define a plurality of feed pockets which successively open to the hopper and the discharge chute upon rotating movement of the rotor, the feed pockets being adapted to effect receipt thereinto of predetermined quantities of the mixture from the hopper and the discharge of same from the pockets into the discharge chute. The heart of the felter design resides in the novelty that the plugs of the rotor segments are variable with respect to their size and configuration wherewith the dimensions of the mixture-receiving feed pockets are controlled and accordingly the bulks of the felted deposits are concomitantly controlled.

In certain applications, the felter may be of the rotative type in the sense that it may be driven rotatively on a vertical axis with respect to the center of the matrix being served, while in other applications, the felter may be of the reciprocative type in the sense that it may be driven reciprocatively on its horizontal axis with respect to the matrix being served.

One principal object stemming herefrom is to organize a machine, of extreme simplicity in construction and efficiency in operation, which allows an ability automatically to place in a given sector or segment of a matrix a given rather than a haphazard percentile of a filler material, all whereby the material wastes and density variations, common to prior art techniques, are eliminated.

Low material costs, combined with a versatile range of physical properties, are the key advantages of the moldings obtainable herewith, such costs and physical properties being capable of wide variation by a judicious control of variables, such as resin type and content, wood particle characteristics, and molding density.

The invention will be best understood from the next-following description of specific embodiments thereof, when read in connection with the accompanying drawings, in which:

FIG. 1 is a schematic representation, in top plan, in somewhat diagrammatic form, so as to serve as a flow sheet diagram, of one arrangement of a typical production line for producing articles according to the invention;

FIG. 2 is a fragmentary schematic representation, in side elevation, of the elevating and pressing stations of the typical production line illustrated in FIG. 1;

FIG. 9 is a view, in side elevation, of the pre-press subassembly of the FIG. 1 line;

FIG. 10 is a view, in top plan, of a matched form of round upper platen for use in the FIG. 9 pre-press subassembly and illustrating the edge ring add-on feature for accommodating to matrix size variations;

FIG. 11 is a view, in side elevation, of the FIG. 10 platen;

FIG. 12 is a view, in side elevation, of a form of rectangular upper platen with the swinging edge add-on size variant;

FIG. 13 is a view, in perspective, of the FIG. 12 platen;

FIG. 21 is a schematic representation, in side elevation, in somewhat diagrammatic form, showing the arrangement of an alternate form of line for the production of limited size panels of varied shapes;

FIG. 22 is a view, in end elevation, of one of the fixed position felters shown in FIG. 21;

FIG. 23 is a view, in end elevation, of the traversing felter shown in FIG. 21;

FIG. 24 is a view, in end elevation, of the press subassembly shown in FIG. 21;

Figure 3:
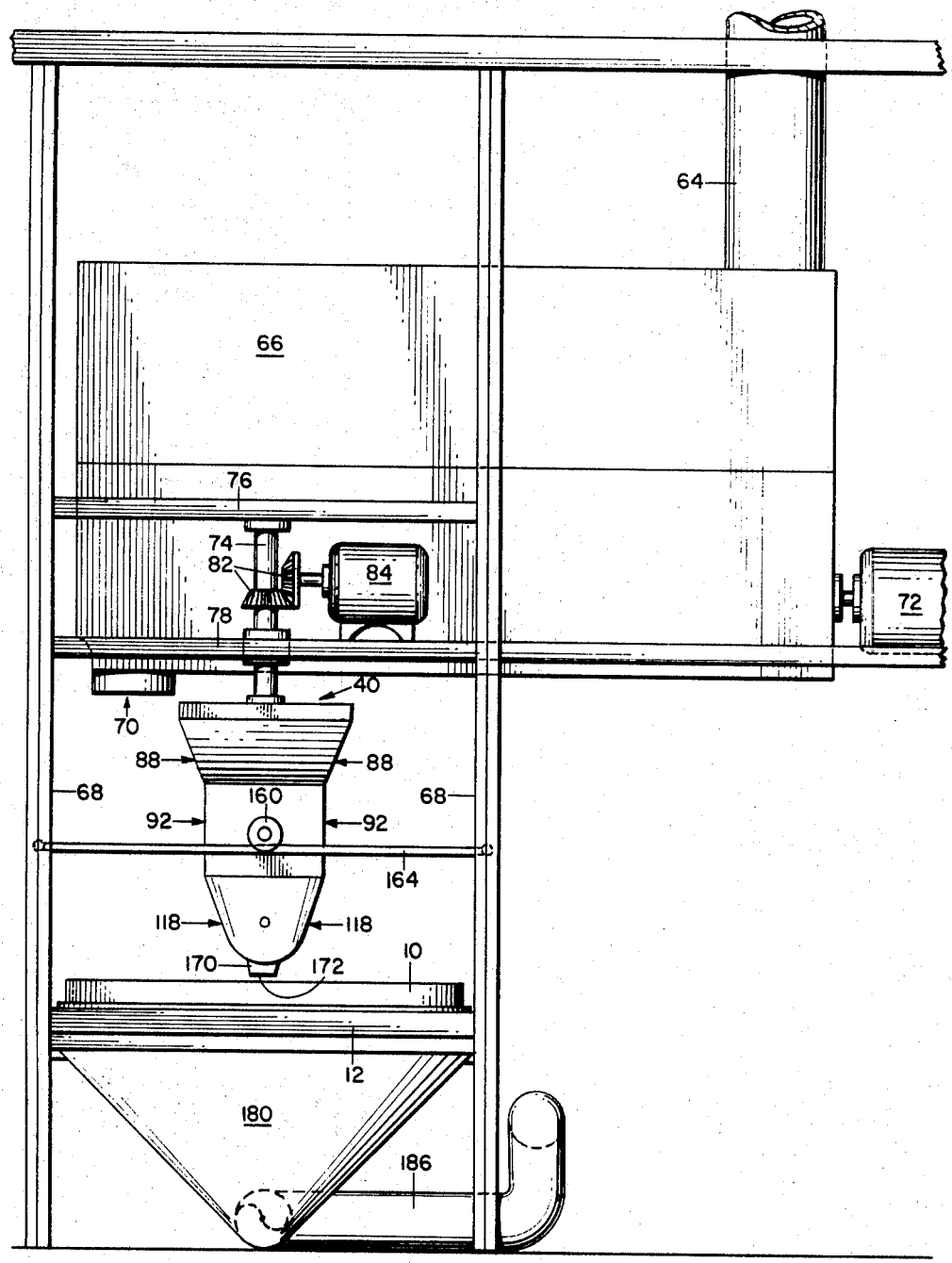
FIG. 3 is a view, in end elevation, of one of the felters of the invention showing cooperant components in their respective operative positions relative thereto.

Before proceeding with the detailed description, it is to be emphasized that the compression moldings hereof are exemplified as formed from mixtures of refined wood particles of specific size gradation and synthetic thermosetting resin binder and sizing and pigment (if same is used).

With respect to the species of wood suitable for the to-be-described process, most native American wood types, in both hardwood and softwood classifications, are adaptable to molding with resins, when reduced to flakes, particles, or flour. Some of the suitable types, however, are either in limited supply or too costly; other varieties, in more abundant supply, have properties such as to cause difficult production problems, making their employment economically unsound. Generally, in the hardwood classification, the hardwoods subclassified as "soft" or "moderately soft" are the best suited and the flours thereof may be mixed, in proportions varying from approximately one-half to three fourths, with those varieties of these subclasses which have been further subclassified as "moderately hard" or "hard," these latter varieties for the most part being not considered suitable by themselves. Most ideal "soft" hardwoods include popple (aspen), yellow poplar, cottonwood and basswood, and most ideal "hard" hardwoods include tupelo (gum), birch, sugar maple, and oak (white or red). Contrariwise, in the softwood classification, most, but not all, varieties are well suited to processing, and generally, due to a higher compression ratio, provide better materials for wood/resin molding. Exceptions are such varieties as are high in rosin or pitch content, a group inclusive of most of the southern pine species. A wood, low in or devoid of rosin or pitch, i.e. redwood, while usable, normally will require a much higher percentage of resin for the bonding purpose. Other than these mentioned exceptions, the color factor will dictate the softwood best for a particular use. The lightest colors produce the best appearing moldings and best blend with pigments for molded colors. Outstanding among the softwoods for processing according to the teachings hereof are the white pines and western (or yellow) pines, best of which is the ponderosa pine, with white fir, Douglas fir, and the spruces being suitable.

It goes almost without saying that woods exceptionally high in knot content are to be avoided, the high pitch content of knots causing rosin pockets and surface "blobs" such as to impede subsequent gluing or painting and to destroy finished appearances. The bark of any species likewise is to be avoided, same lending no strength to the molded end product, absorbing abnormal quantities of the resin of any mix, and causing unsightly "peppering" in end product appearance. Similarly, newly-cut or "green" wood is totally unsuitable in the absence of extensive preliminary treatment.

With respect to moisture content of the material for optimum processing, according to the invention, a dry range of between 3½ and 6% is indicated.

The wood flour particle size is preferentially from #4 to #20 mesh for cores and from #40 to #160 mesh for base, edge and surface treatments.

Zinc stearate, as a sizing compound, is added to impart water-resistance to the finished product. A fractional percentile of a wax, such as carnauba wax, may be employed to further inhibit moisture absorption.

The resin binder is by far the costliest ingredient of the wood flour/resin mixes comprehended. The three basic types, in order of increasing cost, are urea, phenol and melamine formaldehydes. Other thermosetting resins of a specialized nature, such as epoxies, may be utilized in obtaining special purpose end products. Although combinations can be used as binders, certain recommendations for their selection generally apply. Urea is best suited for low cost moldings where moisture resistance is not required. For a given density and resin content, its physical properties are generally lower than those of either phenolic or melamine moldings. Phenolic, on the other hand, is for stronger, more moisture-resistant moldings, the moldings being usually darker in color than the wood component and darkening further upon exposure to sunlight. Melamines, on still another hand, are adapted for colorful moisture-resistant moldings, offering superior surface gloss and hardness. Most expensive of the three, they can be pigmented so as to provide practically any light-stable color.

Formed articles are preferentially molded at pressures of from 600 to 1500 p.s.i. and at temperatures of from 280 to 340° F. wherewith to produce densities ranging from 44 to 88 lb. per cu. ft.

In my experimentation, I have found best results in core mixes constituted by a base mix including:

| | Lbs. |
|---|---|
| #4 mesh wood particles | 99.5 |
| Zinc stearate | .5 |
| | 100.0 |

From such base mix, I have formed typical core mixes identified as follows:

"10% phenolic":

| | Lbs. |
|---|---|
| Base Mix | 90.0 |
| Resin | 10.0 |
| | 100.0 |

"12% phenolic":

| | |
|---|---|
| Base Mix | 88.0 |
| Resin | 12.0 |
| | 100.0 |

"15% phenolic":

| | |
|---|---|
| Base Mix | 85.0 |
| Resin | 15.0 |
| | 100.0 |

"20% melamine":

| | |
|---|---|
| Base Mix | 80.0 |
| Resin | 20.0 |
| | 100.0 |

"25% melamine":

| | |
|---|---|
| Base Mix | 75.0 |
| Resin | 25.0 |
| | 100.0 |

Typical fines mixes have been prepared similar to the base mix above noted, but with a fines grade of wood flour and with melamine resin, preferentially comprising something in the order of 25–35% of the mix. In this instance, pigments would also normally be added.

Let it here be reiterated that the methods and apparatus hereof are adaptable for use with particle mixtures other than those of the wood flour types and comprehend particles of other commonly used cellulose or mineral products having capacities, when compressed, for fusing together into permanently compacted masses.

With reference to FIG. 1, the general flow of the production line, used in the method of frabricating an article, such as an exemplified table top, will first be briefly described.

The first operation, denoted at the station designated by numeral I, is performed within a positive pressure room and comprises the insertion of a cut-to-size resin-impregnated base or backing paper or papers into the bottom of the matrix or mold in which the article is to be formed.

The second operation, denoted at station II, is to set the edge-retaining form within the matrix or mold. Here to be mentioned is the fact that if a greater-than-standard thickness of article is envisioned, said mold will be provided with a supplemental load-retaining wall to accommodate to the consequent greater-than-average depth of the load to be charged into the mold.

The third operation, at station III, is automatically to felt a mix of base fines in the central area of the mold, such area being defined by and within the wall of the edge-retaining form, and over the base or backing paper or papers lining the mold bottom.

The fourth operation, at station IV, is automatically to felt a core mix in the central area, within the edge-retaining form, and over the previously-felted layer of base fines.

The fifth operation, at station V, is automatically to felt an edge fines mix into the outer perimetral area, that area defined by and outside of the wall of the edge-retaining form, to a depth corresponding to the depth of the previously-felted center fill.

The sixth operation, at station VI, is manually to remove the edge-retaining form from the now partially-filled mold.

The seventh operation, at station VII, is automatically to level the partial load in the mold.

The eighth operation, at station VIII, is automatically to felt a mix of surface fines over the entirety of the area of the partially-loaded mold.

The ninth operation, at station IX, is automatically to level the uppermost surface of the now-loaded mold.

The tenth operation, at station X, is automatically to cold pre-press the full mold load to a fill:finished thickness ratio of something generally in the order of 2:1.

The eleventh operaton, at station XI, within the positive pressure room, is manually or mechanically to apply a cut-to-size resin-impregnated surface decorative overlay paper or papers, together with a surface protective or foil sheet, upon the uppermost surface of the now pre-pressed load.

The twelfth operation, at station XII, is manually to separate from the mold the no-longer-required supplemental load-retaining wall from the mold, if one has been used.

The thirteenth operation, at station XIII, is to move the mold and its pre-pressed load into the elevator preparatory to transfer to the hot press.

The fourteenth operation, at station XIV, is to pass the mold through the cure and compression cycle of the hot press for achievement of the desired end product thickness.

The fifteenth operation, at station XV, is to transfer the mold to the cooling press for a more moderate pressure cycle under cooling conditions.

The sixteenth operation, at station XVI, is to transfer the mold to the unloading elevator.

The seventeenth operation, at station XVII, is to unload the elevator and remove the formed article from the mold by mechanical or manual means.

The eighteenth operation, at station XVIII, is to clean the now-emptied mold by mechanical brushing and/or vacuuming means, the so prepared mold being retained, as the nineteenth operation, at station XIX, readied for the next-succeeding forming cycle.

At station XX, the twentieth operation, as earlier referred to, is to attach the supplemental load-retaining wall, when and if greater-than-standard-thickness of loads are contemplated.

With reference again to FIG. 1, the molds or pans 10 are moved through stations I–XX via a horizontally-disposed, continuous, mechanized chain or gear-drive conveyor 12 of conventional design, appropriately controlled at each station as by limit switches (not shown) as well as at a master station as by a time sequence control means (also not shown), all as is known in the developed art of step-by-step conveyance sequentially through a series of stations or work-performing operations.

Conveyor 12 is mounted with respect to and between parallel elongated ways or side rails and upright supporting legs 16, all of conventional design, and is adapted to transport longitudinally therealong on a stop-and-go basis a plurality of molds and their loads for strategic in seriatim positioning at the plurality of stations of the line and to accomplish all of the same by movement generally in the direction indicated by arrows a. While the conveyor exemplified traces generally a circuitous path, the path could be of a straight-line run type or otherwise as best to suit local plant geography and/or other dictates of a specific installation.

Figure 15:
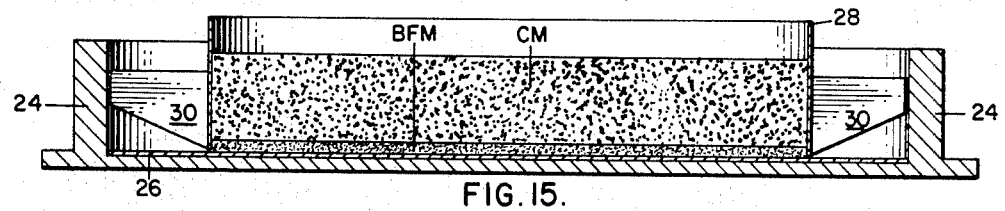

Mold 10, in the exemplification, is shown as formed of a rigid metal, circular in configuration, to define, as shown in FIG. 15, a flat bottom wall 22 and a side wall 24 of inside dimensions generally corresponding to the size of the article formable therewithin.

As will develop more fully hereinafter, it is conceivable that the molds may be of rectangular configuration or the molds of the line may be constituted by combination of molds of circular and rectangular configurations. The process and apparatus hereof is being first delineated with respect to a line employing only circular molds, all in an effort to avoid unnecessary confusion.

The first operation, at station I, is performed within an enclosed positive pressure room 18 defined by walls 20, into which room a continual flow of filtered air will be introduced at a greater-than-atmospheric pressure. Preferentially, appropriate temperature and humidity control means are provided for maintaining the room at desired temperature and humidity levels. Such features, being conventional, are not illustrated.

Within positive pressure room 18, mold 10, positioned upon the conveyor, is prepared by manually or mechanically inserting thereinto a cut-to-size resin-impregnated base or backing paper 26 in a bottom-wall-covering manner, as shown in FIG. 15. Where practical, a plurality of plies of such base paper may be so placed.

Let it here be explained that such base paper, by reason of the self-contained high resin content, allows fusion of the paper to the body of the being-formed article. Additionally, such resin constituent provides an increased degree of wearability of the surface of the end product.

The so-prepared mold 10 is transported, via conveyor 12, to station II whereat an edge-retaining form 28 is placed into the mold, said form comprising an upstanding annular wall or ring and a plurality of spaced radially-extending centering fins 30 projecting outwardly circumferentially of the annular wall, the fins being confrontable with the inner face of mold side wall in the well-known centering manner, as shown in FIG. 15.

With the edge-retaining form in situ, the mold is conveyed to station III, where ensues the automatic felting of a base fines mix into the mold central area, defined as that mold area within the confines of the annular wall of the edge-retaining form and of course upwardly of the base paper.

In FIGS. 3–7 are shown the details of a standard felter 40 for the layup of a round end product such as here being considered and same is to be described in detail hereinafter.

Wood shavings, delivered from a rough storage silo (not shown) pass via a conduit 42 to a conventional hammermill 44 and the particles there produced are passed therefrom through a dryer 46 to a screening means 48, from which screened base fines are delivered via a conduit 50 to a base fines storage bin 52 for delivery therefrom via a conduit 54 to a mixer 56.

The resin charge will have been delivered via a conduit 58 to a resin storage bin 60 and therefrom via a conduit 62 to said mixer 56.

Mixer 56 is provided with cooperant adjustable control means by which the quanta of sizing compound and resin, and pigment if employed, which are delivered thereto, are measured before delivery according to the quantity of delivered base fines, all in accordance with a selected formulation, several of which are above exemplified, to the end that only proper proportions of these ingredients are mixed therewithin.

Delivery of the base fines mix, represented in FIGS. 15–21 by BFM, from mixer 56 is via a conduit 64 (see FIG. 3) into a surge tank 66 supported upwardly of felter 40 by means of frame uprights 68, said tank having a lowermost discharge opening 70, with which opening felter 40 has a one-time registry in the course of its sweep through it allowed rotative path.

The mix delivered to surge tank 66 is agitated therewithin by means of an agitator (not shown) driven by an agitator drive motor 72 whereby the constituent materials are again thoroughly mixed.

It will be appreciated that mixer 56, surge tanks 66 and felter 40 are for the processing of that mix which is to comprise the base layer of the forming product immediately above and adjacent the base paper.

Felter 40 is mounted on a vertically-disposed main supporting shaft 74 so as to be rotatable on the axis thereof, either clockwise or counterclockwise, through a full 360° circle, same being referred to hereinafter as the felter rotative movement.

Shaft 74 preferentially depends downwardly from and is journalled with respect to upper and lower cross arms 76 and 78 respectively, mounted between uprights 68 of the machine frame, so as to allow freedom of felter rotative movement.

Shaft 74 also mounts a vertically-disposed rear yoke 80.

A felter rotary drive is constituted by a pair of bevel gears 82, one mounted on shaft 74 meshing with the other, mounted on the driven shaft of a felter motor 84 suitably mounted on and stationarily secured with respect to the machine frame.

Felter 40 serves as the feeding or distributing device to provide under gravity-feed conditions the flow of the mix delivered thereto from surge tank 66 to the molds as same are brought in seriatim into registered loading position immediately thereunder, and envisions an uppermost hopper 86 having spaced opposite inwardly-tapering side walls 88 and a junk trap screen 90 covering its uppermost open top, which open top serves as a feed entry or opening with reference to the surge tank. Hopper 86 opens to the top of an agitator 94, located in the felter intermediate section, vertically below the hopper, and defined by spaced opposite vertical side walls 92 unitary with respective side walls 88. Said agitator, generally horizontally-disposed, is constituted by a pair of agitator blades disposed in right angular relationship as to each other, one in the form of a short blade comprised of a pair of sinuous members 96, extending alternatingly back and forth throughout the blade length on opposite sides of the central longitudinal agitator axis, the other in the form of a long blade comprised of a pair of sinuous members 98 likewise extending alternatingly back and forth throughout the blade length on opposite sides of the same axis. Members 96 of the so-called short agitator blade extend radially outwardly from the central longitudinal agitator axis so that, upon agitator rotation, the outermost edges thereof define a relatively small circle $x$, and members 98 of the so-called long agitator blade extend radially outwardly with the outermost edges thereof defining a relatively large circle $y$, see FIG. 5.

The opposite terminals of the agitator blades are secured to vertically-disposed end plates 100 rotatably mounted in the respective spaced opposite vertical front and rear walls 102 and 104 respectively of the felter and are also fixed to respective stub shafts 106 journalled in bearings 108 mounted in a forward yoke 110 and said rearward yoke 80. The inboard stub shaft 106 is splined to and suitably driven by the driven shaft of a variable speed reversible drive motor 112 mounted upon a table 114 which is supported by and rotatable with the rearward yoke.

Horizontal yoke braces 116 extend between the forward and rearward yokes and on opposite sides of the felter, and unisonly, the yoke components serve to support same upwardly of the conveyor and molds.

Disposed vertically below agitator 94 and within a lower section of felter 40 as defined by inwardly-inclined and curving side walls 118, unitary with respective side walls 92, is a felting rotor 120 mounted on a horizontally-disposed felting rotor shaft 122 which shaft is journalled at opposite ends in yoke bearings 124 and is driven by a suitable speed reduction gear train 126 and coacting chain drive 128 driven from the driven shaft of drive motor 112.

Felting rotor 120 is comprised of a plurality of rotor segments 130 coaxially arranged as to each other and sleeved in side-by-side manner upon the rotor shaft, each said rotor segment including a plug 132 mounting a plurality of radial outwardly-projecting circumferentially-arranged rotor segment pocket walls 134 held in equispaced relation as to each other by a circular rotor segment divider plate 136 positioned transverse to the axis of its respective segment at one side of the plug.

A hub 138 of each rotor segment is sleeved within its plug and is provided with splining means for its securement to shaft 122 and with a projecting annular boss 140 extending outboard of the vertical plane of its rotor segment divider plate 136, the boss being provided on its end face with a plurality of circumferentially-arranged inwardly-extending locator pin sockets 142. The opposite end of hub 138 is inset inboard of the vertical plane of the opposite end of the rotor segment and the end face thereof is similarly provided with a plurality of circumferentially-arranged inwardly-extending locator pin sockets 142.

A pair of adjacent rotor segments are held together as by locator pins 144 receivable in aligned pairs of locator pin sockets 142.

Figure 4:
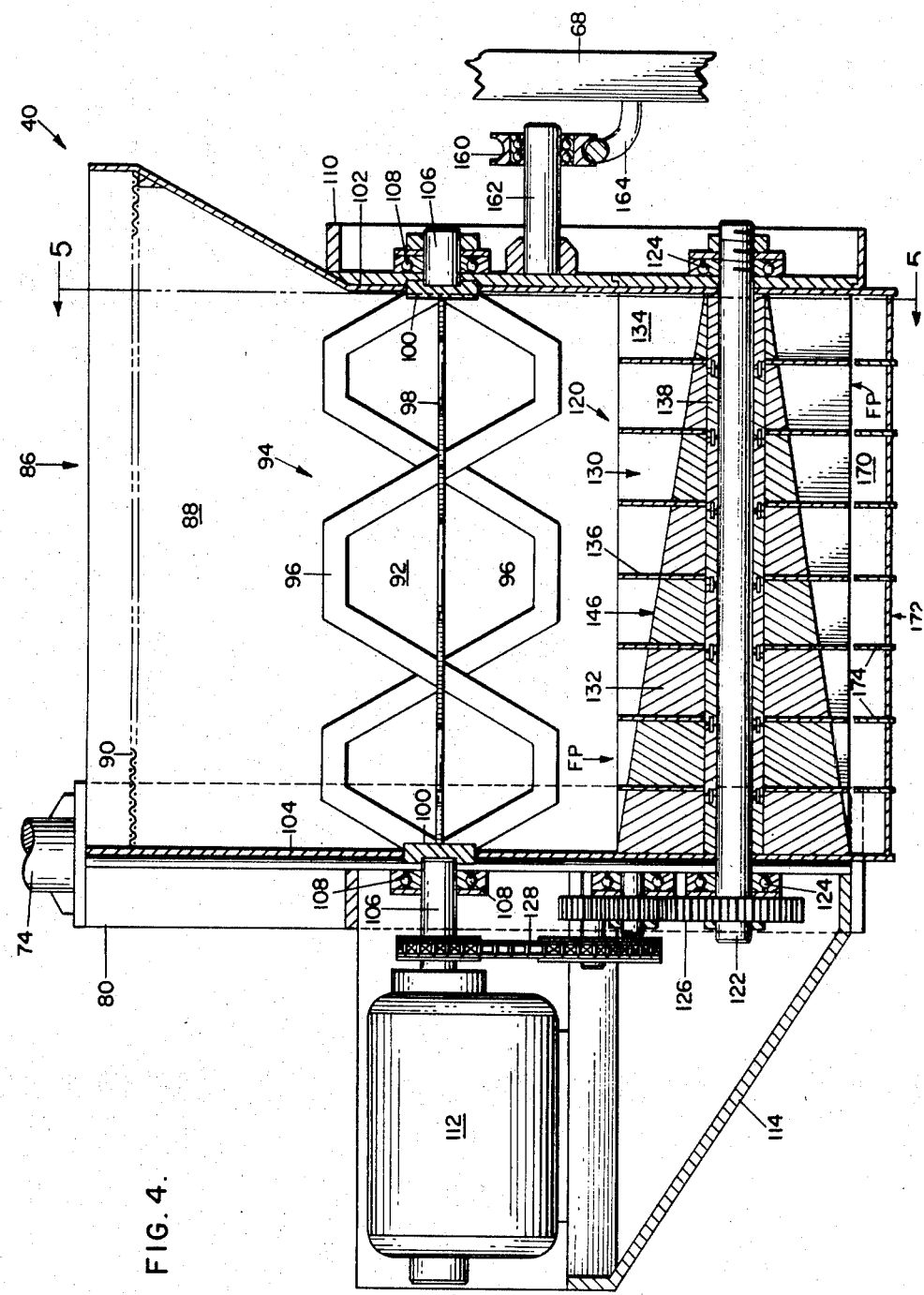
FIG. 4 is a view, in transverse section, on an enlarged scale, of the felter shown in FIG. 3.
Figure 5:
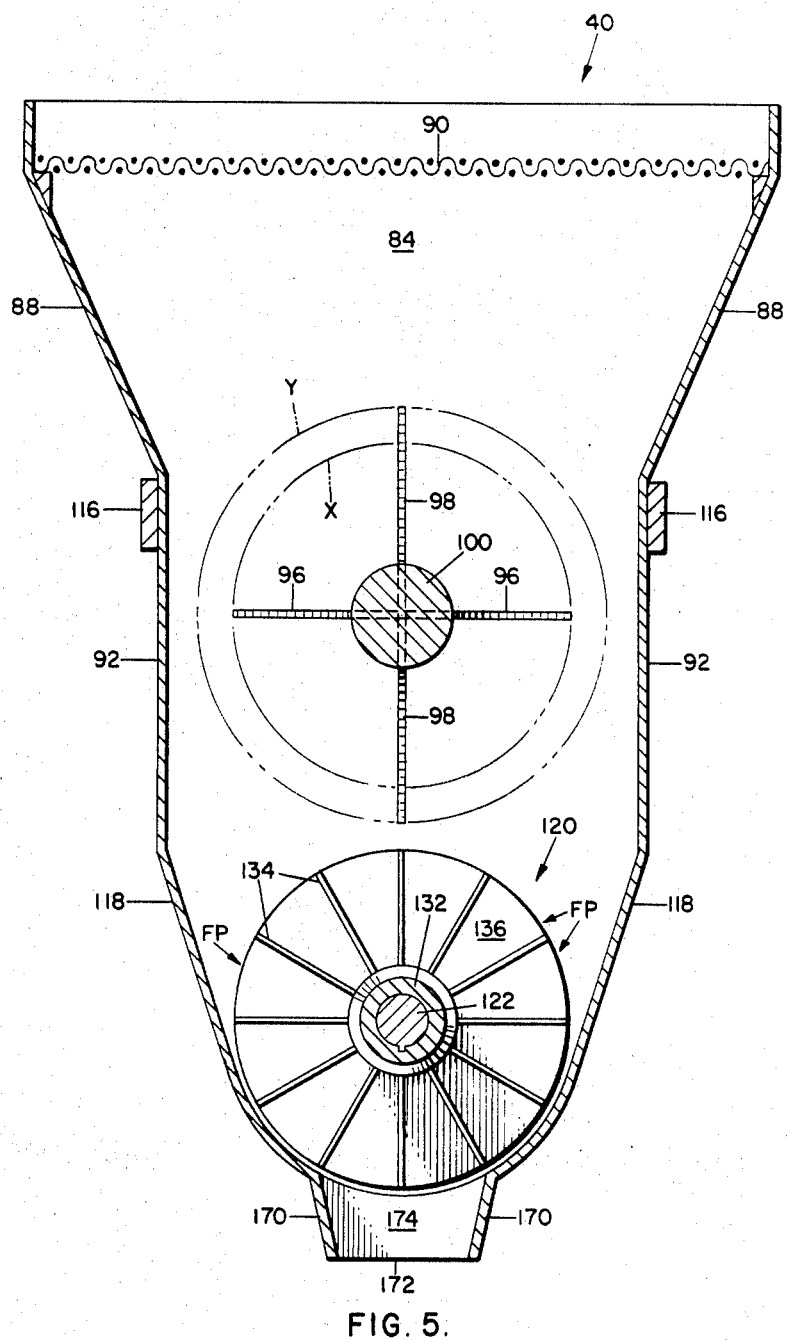
FIG. 5 is a view, in section, on an enlarged scale, taken on line 5—5 of FIG. 3.
Figure 7:
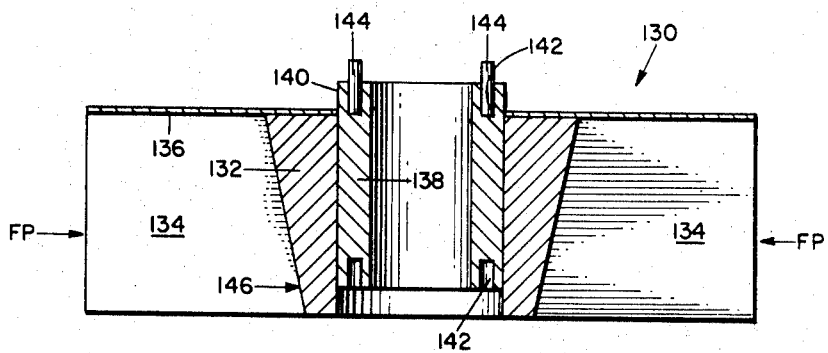
FIG. 7 is a view, in section, of the segment shown in FIG. 6.
Figure 6:
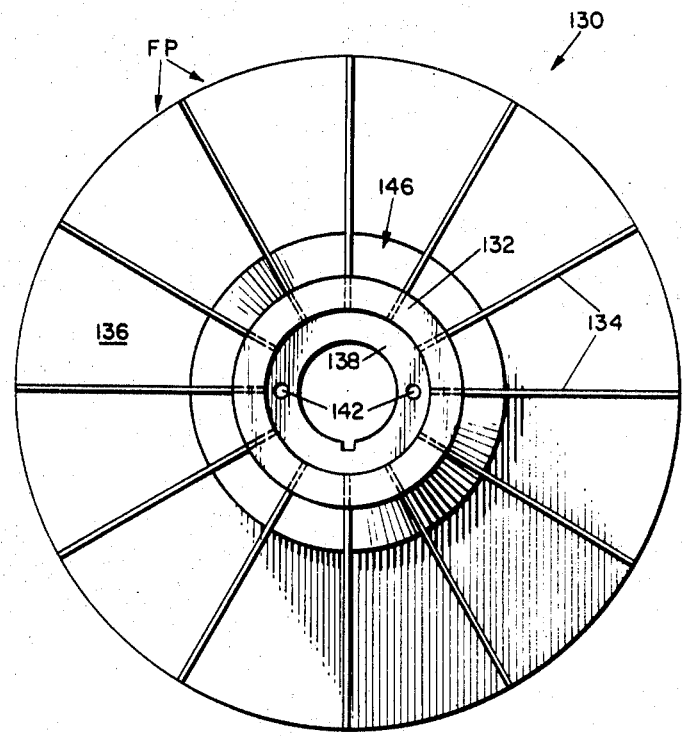
FIG. 6 is a view, in end elevation, on an enlarged scale, of one of the segments of the felting rotor of the felter shown in FIG. 3, taken on line 6—6 thereof.

The outer walls 146 of the plugs of adjacent rotor segments are so inclined that when the totality of rotor segments are assembled together in tandem, a generally frusto-conical configuration is defined, as best shown in FIG. 4.

The arrangement provides, within the area of each rotor segment a series of circumferentially-disposed outwardly-opening feed pockets FP, each said feed pocket being constituted at its opposite ends by its respective rotor segment divider plate 136 and the divider plate of the next adjacent segment and at its opposite sides by a pair of adjacent rotor segment pocket walls 134 and at its bottom by the sector of outer wall 146 of the plug.

Segment plugs of varying dimensions, as determined by mathematical correlation of feed pocket volume to mold area being served, may be employed, all so as to accomplish the delivery of any predetermined quantity of material in any selected area of the mold by the simple expedient of quickly disengaging the rotor, removing the particular segment and substituting therefor a segment of a correct size or sizes.

As rotor 120 rotates on its horizontal axis, on shaft 122, the feed pockets of each of the segments are successively brought into communication with the area therebelow, shortly to be described, so that the contents of said feed pockets may be distributed thereinto at a rate and in a quantity as determined by the rotative speed of the rotor and the sizes of the feed pockets.

The felter, being rotative on its vertical axis covers in its sweep the entirety of the area of mold 10 located centrally of and vertically below said felter and is aided in such rotative movement by a supplementary support wheel 160 journalled on a stub shaft 162, which shaft is rigidly fixed to and extends outwardly of forward yoke 110. Support wheel 160 rides in a circular support wheel track 164 suitably mounted on the machine frame designated by 68.

The lowermost section of the felter includes a pair of inclined side walls 170 unitary with respective side walls 118 and serving as shields at opposite sides of a lowermost discharge mouth 172 of such dimensions as effectively to accommodate the material being felted therethrough. Between side walls 170, vanes or fins 174 are disposed vertically in spaced relationship as to each other, each vane being alignable with a respective one of the circular rotor segment divider plates 136 of the felting rotor, the vanes serving unisonly to confine the given gravity feed of mix from each rotor segment and to control movement of same to the point of its deposit within the mold immediately therebelow.

A recovery bin 180 below felter 40, communicates with a recovery conduit 186 and serves for the return of any spilled or excess mix to any desired reuse point.

It appears propitious to here interject that, with respect to felter 40, in essence, the principle exploited is in consideration of the facts that the rotor segments and their respective feed pockets are spaced at points along a line parallel to and upwardly of a radius of the mold and that as the felter rotates on a fixed axis through 360°, the width of a rotor segment defines a circumferential path, the paths of the several aligned rotor segments being concentric as to each other. Distribution of material from the pockets during the course of felter rotation dictates a greatest distributing capacity or pocket volume for that circumferential path farthest from the fixed axis and a smallest distributing capacity or pocket volume for that circumferential path nearest to the fixed axis, circular motion being rotational motion in which each point of a rotating body along its radius moves in its own circular path about the fixed axis with a different velocity, the velocity increasing directly with the linear distance from the fixed axis. By controlling the volumes of the distributed material of the adjacent rotor segments so that they are directly proportional to the respective circumference of the path defined by its rotor segment an even distribution of the material over the totality of the mold area is assured.

Figure 16:
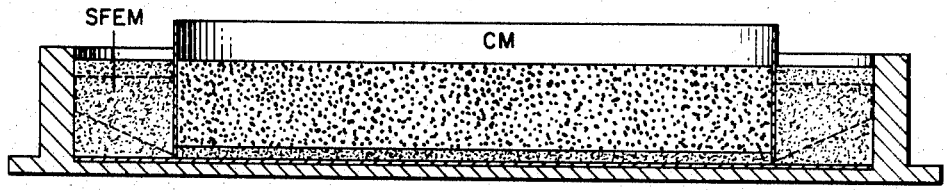

The mold is then conveyed via the conveyor to station V to a position under another felter 41, called an edge felter, which felts a special fines edge mix, delineated SFEM, into the outer perimetral area of the mold outside of the edge-retaining form and to a depth equal to the depth of the center fill of combined base fines mix BFM and core mix CM, as shown in FIG. 16. Such special fines are delivered from a source of supply (not shown) through a conduit 61 to a special fines storage bin 63 and therefrom in proper quantity via a conduit 65 to a mixer 67 which carries a means to predetermine the proportionate quantities of wood particles, resin sizing compound, and pigment delivered thereto, said resin being understood to be delivered thereto from resin storage bin 60 via conduit 62. Delivery from mixer 67 is through a suitable conduit into a surge tank similar to surge tank 66 supported upwardly of felter 41.

Figure 8:
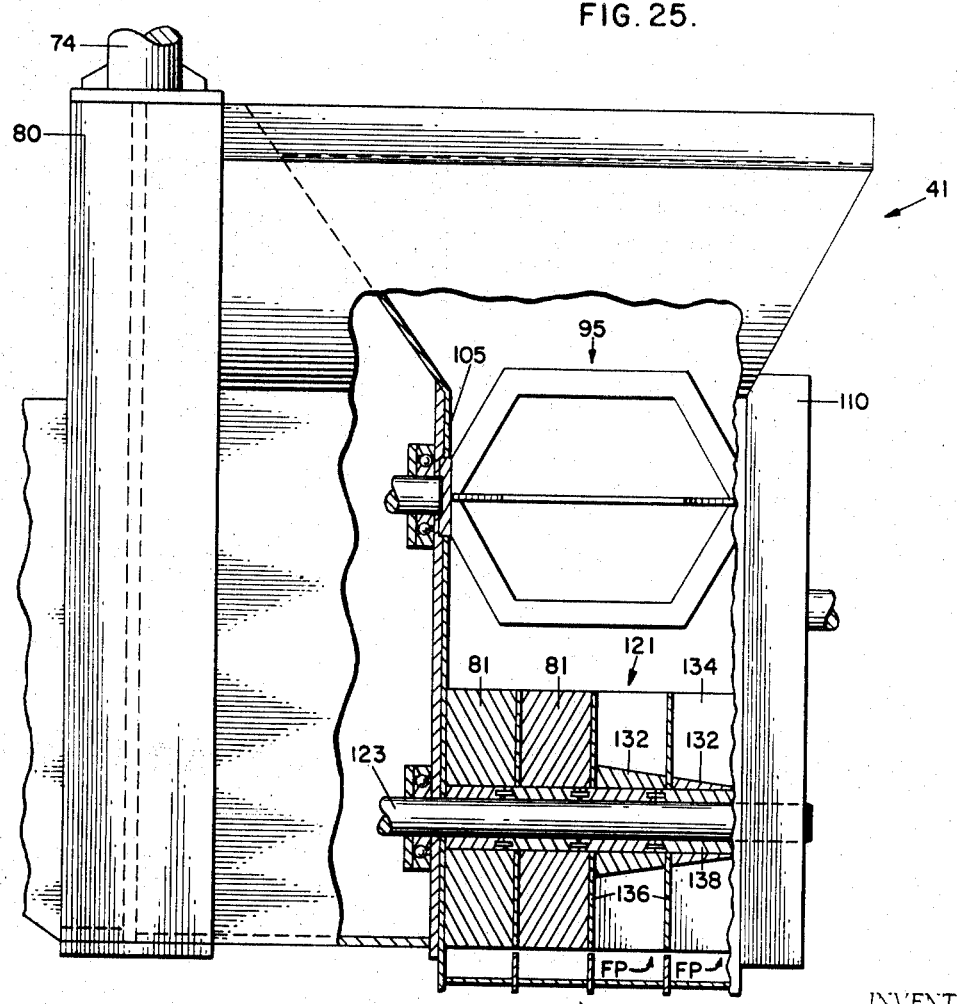
FIG. 8 is a fragmentary view, in side elevation, with parts broken away for clarity, showing a modified form of felter for attainment of special felting effects, according to the teachings of the invention.

For felting such special fines edge mix only within the outer perimetral area, felter 41 is of a modified form, as best shown in FIG. 8. Rear wall 105 thereof is seen to be more closely spaced with respect to the front wall, thus to define a more restricted operating area within which a foreshortened agitator 95 and a foreshortened rotor 121 are disposed. According to the portion of the radial dimension to be felted, certain of the rotor segments, nearest to the vertical axis about which the felter rotates, may be "blocked off" as by full segment plugs 81, thereby to confine the outflow of mix so as to felt only the said perimetral area of mold 10, by means of the endmost rotor segments, two of which are illustrated, having the aforedescribed plugs 132 and related pocket forming devices, and embracing a felting zone denoted by Q.

Figure 14:
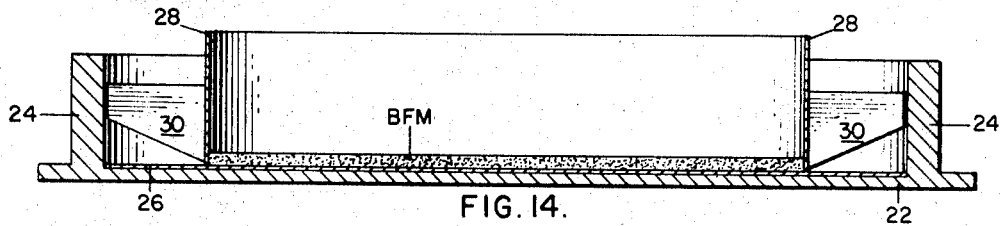
FIGS. 14-19 are views, in section, through a matrix in the sequential stages of article formation.

Mold 10, with its felted load of base fines mix BFM, as shown in FIG. 14, is then conveyed to station IV to a position under another felter of similar construction which felts a core mix, delineated CM, again in the center area within the wall of the edge-retaining form and over the earlier deposited layer of base fines mix, as shown in FIG. 15.

The core mix is delivered from screening means 48 via a conduit 51 to a coarse wood flour storage bin 53 and therefrom in proper quantity via a conduit 55 to a mixer 57 which predetermines the quantity of wood particles passing through it and automatically adds and mixes the properly proportioned amounts of sizing compound and resin, the resin being delivered thereto from the previously described resin storage bin 60 via the aforementioned conduit 62. Delivery from said mixer 57 is through a suitable conduit into a suitable surge tank supported upwardly of the station IV felter for discharge thereinto. Said felter, being similar in design as the felter heretofore described, is not here explained in such detail.

In other words, by the provided means, when it is desired to block off a rotor segment or plurality thereof nearest to the vertical axis or at any other point along the mold radius so as to allow felting of any special kind, a felter 40 may be quickly converted to a modified felter 41 or to any other desired modified type for the specific felting program comprehended.

Following the felting operation at station V, the mold is moved to station VI where the edge-retaining form is manually removed from the partially-filled mold, the so-removed forms being returned to station II along the route indicated by arrow b.

Figure 17:
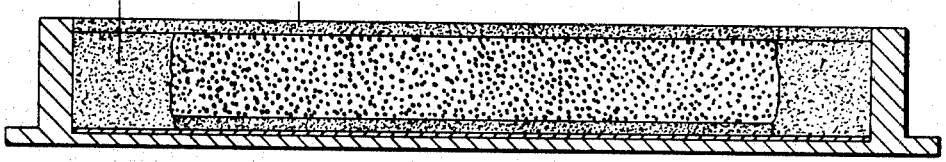

The mold is then conveyed to station VII where it is passed under a levelling means 190 of suitable design for levelling the partial load in the mold, prior to transfer of the mold to station VIII where another felter of the station III type felts a special surface fines mix, delineated SSFM in FIG. 17, over the entirety of the partially-filled mold, said mix being delivered to the felter from mixer 67, which may be common to both felter 41 of station V and felter 40 of station VIII where the types of mixes employed therewith are the same.

The mold is next conveyed to station IX where it passes under another levelling means 200 of common type and whereby the surface of the now-loaded mold is once again leveled preliminary to the cold-pressing operation of station X.

The press 202 of this station, as shown in FIG. 9, is of any conventional design and may include a frame of laterally-spaced pairs of uprights or columns 206 supporting opposite ends of horizontal beams 208 which mount a hydraulically-operated cylinder and piston assembly 210 which actuates a ram 212 carrying at its lower end an annular pressure member 214 mounting a platen 216, which platen is urged downwardly so as initially to compress the pulverulent material within the mold into a consolidated annular body. Preferentially, the cold-prepressing operation compresses the load from a fill to finished thickness ratio of about 2:1 as shown in FIG. 18.

Figure 18:
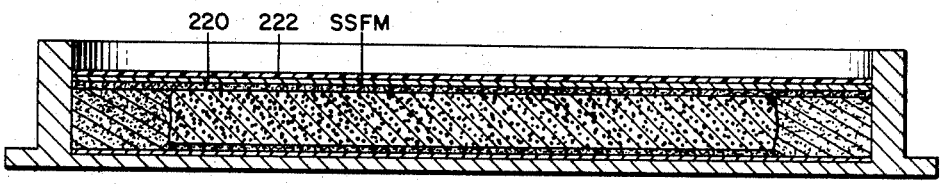

The mold is next passed to station XI, within positive pressure room 18, whereat a cut-to-size resin-impregnated surface decorative overlay paper or papers 220, together with a surface protective or foil sheet 222, are applied to the top of the so prepressed mixture, see FIG. 18.

It may be here interjected that the surface decorative treatment may take one of several forms.

For example, one such method envisions a technique which simplifies the decorative aspect of the program by reducing the application of resin-impregnated papers to a single sheet in the case of each surface concerned. Albeit, a simplified step of the procedure, a full color range of pattern is realizable with resultant surfaces meeting, even surpassing, applicable specifications. Herewith, decorative surfaces of exceptional clarity and depth can be achieved which are possessive of excellent color rendition and which, with respect to wood grain, are inconceivably realistic.

This technique is based on a reverse printing of the pattern or wood grain directly on the overlay paper itself so that the printing, after lamination, is on the underside of the transparent overlay, with the pigmented fine wood flour/resin sub-strata serving as the basic ground-color. With the ground-color material making up the edge of the finished unit, a totally complementary effect is achieved. One of the two key requirements of such decorative method is in the printing of the overlay. Early, single color, prints lacked sufficient tone rendition and contrast. Later multiple color process printings proved more effective. Today, any pattern or wood grain normally printed on regular opaque papers can be reproduced on overlay papers with dramatic results. The other key requirement relates to the quality of the sub-strata material, it being essential that the sub-strata material be of extremely uniform color and texture and of suitably high melamine resin content to provide for the required strength, hardness, and impact resistance.

The mold is next passed to station XII where the supplemental load retaining wall is removed, if used.

The filled mold is then delivered to a loading elevator 230, of any practical commercially-available design, at station XIII, for transfer of the mold from the conveyor to the hot press, a typical elevator being one comprising a plurality of spaced platforms 232 motivated upwardly and downwardly by cable means 234 and/or a hydraulic system, wherewith the said platforms are first raised in seriatim to the level of the conveyor for transfer of a mold thereonto. When the platform series has been so loaded, the series is suitably elevated to a point where a loading pusher 236 (FIG. 2) is called into play to move the molds laterally onto the aligned platens of the hot stock press 240 of station XIV.

Figure 19:
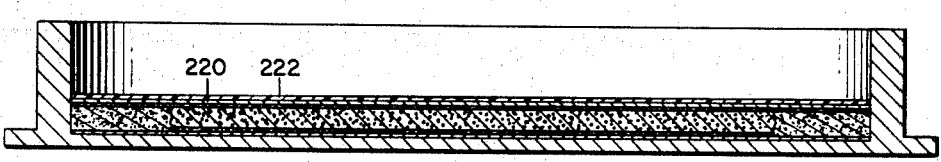

The hot stock press, also of conventional design and continually heated by circulating steam or hot oil, allows the compressing of the mold loads in a hot press cure cycle for attainment of a specified product thickness, stop means (not shown) being employed between the hot press platens for effecting control of said finished product thickness within desired limits. Such a compressed end product is shown in FIG. 19.

The molds are then transferred laterally to an aligned platen of an adjacent cooling press 250 of the fifteenth station, same also being of conventional design and being cooled by means such as circulating cold water, whereby the molds may be held under a more moderate pressure during the cooling cycle.

At the sixteenth station, the molds are laterally transferred from the cooling press to the unloading elevator 260.

The finished articles are lowered to the level of station XVII for lateral transfer thereto, and whereat the now cured units are removed from the molds as by a mechanical or manual means and made ready for packing, storage and shipment.

At station XVIII, the molds are passed through suitable automatic brushing and/or vacuuming means 270 for thorough cleaning preparatory to recycling.

At station XIX, the nineteenth operation of retaining the empty molds in a holding area preparatory to the next operating cycle ensues.

At station XX, the twentieth operation is to attach the aforementioned supplemental load retaining wall, if one is next to be required.

The so-far described process can now be seen to have combined the techniques of: (1) high pressure melamine decorative laminating, (2) high density refined wood flour molding, and (3) fines-surfaced particleboard manufacture.

It is here to be stressed that while a layup of a stratified type of structure has just been defined, the apparatus and technique lend themeselves to easy modification as by no more than rendering certain components inoperative so as to permit the layup of a non-stratified type of structure as may be served by a single felter for the felting of a single mix which would be homogeneous throughout the diameter and depth of the mold.

Also significant is the allowability of the omission of a layup of a base fines mix where same, for any particular reason, may not be considered necessary for the base of a particular product and/or the omission of the layup of an edge fines mix where same, for any particular reason, may not be considered necessary for an edging of a particular product. Obviously, all manner of layup situations and strata combinations are contemplated as within the purview hereof.

Worthy of special stress also is the fact that the process line of FIG. 1 may incorporate a series of reciprocating felters, one of which is to be subsequently described, in lieu of the delineated series of rotating felters for the layup of such as rectangular or other than round units.

Also, the process line of FIG. 1 conceivably could include in such as a 40 unit or mold line felters of both types wherewith, by means of the rotating felters, say 32 molds of the circular type could be served, and in the same line, by means of the reciprocating felters, 8 molds of the rectangular type could be served simultaneously therewith, all with the aid of suitable timing control mechanism for effectuating the service of rotating felters to the circular molds and the service of reciprocating felters to the rectangular molds.

Figure 20:
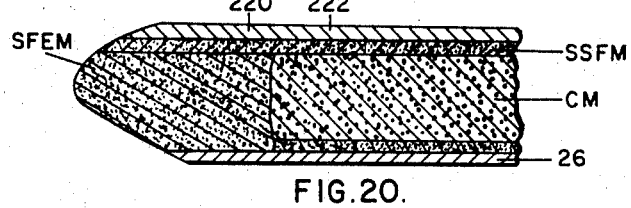
FIG. 20 is a fragmentary view, in section, through a formed article with an exemplification of the edge configuration treatment thereof.
Figure 26:
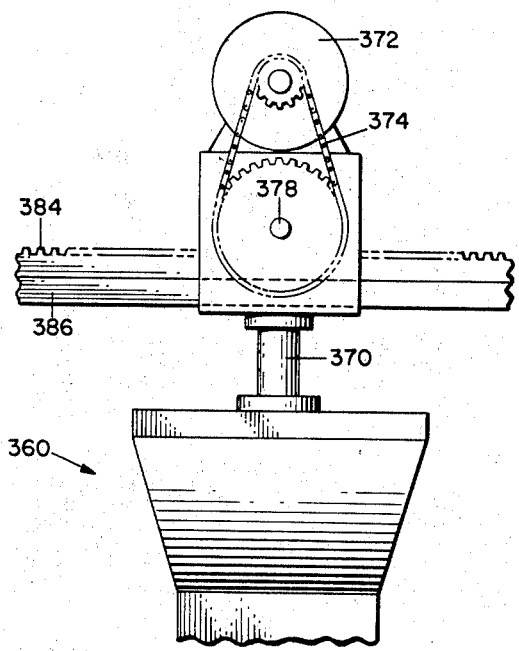
FIG. 26 is a fragmentary view, in side elevation, showing a drive unit for traversing the modified FIG. 25 felter in rectilinear movements as dictated by rectangular layup situations.
Figure 27:
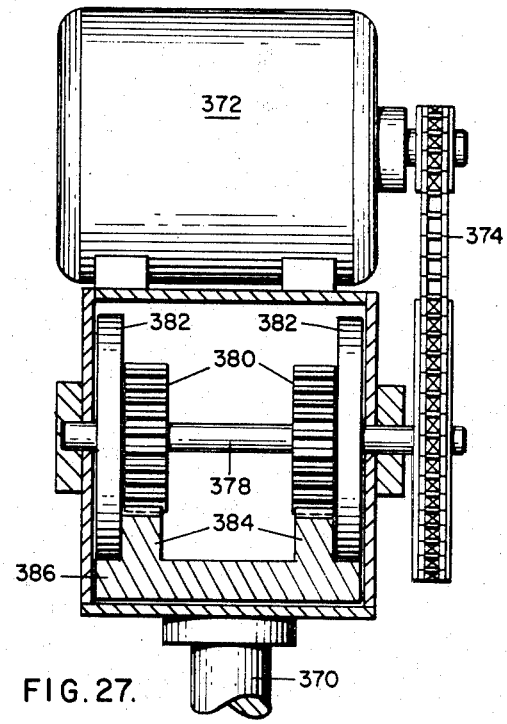
FIG. 27 is an enlarged view, in transverse section, of the FIG. 26 drive unit.

As another specific detail dignified by special mention, attention is called to the FIG. 20 showing wherein as shown, in fragmentary view, a greatly exaggerated cross section of an edge of a table top formed according to the FIG. 1 line technique but wherein the mold formed edge has been subsequently shaped to a desired configuration by an independent shaping operation of any commonly known method. As same is not a part of the invention, such shaping operation is not here considered in any greater detail. What is important, in this consideration, is that for normal volume production runs, the straight sided edge mold, such as typified in the FIGS. 14–19 series of drawings, is the likely to be used matrix type, with any special and desired edge configuration being obtained as by any independent shaping or edging equipment, all according to the whims and desires of the individual manufacturer and/or his customer, there seemingly being as many concepts as to what configuration an edging should take as there are manufacturers. However, it is to be understood that, for large volume production, any configuration of edging may be achieved by the use of a complemental configuration in the mold side wall, all whereby the subsequent edge shaping operation would obviously be avoided as unnecessary.

Passing now to the exemplification in FIG. 21, therein an alternate form of process line is shown, same being designed for the production of such as panels of limited size or sizes on what is sometimes referred to as a continuous-mat technique. In this exemplification, rectangular forms, such as school desk tops are borne in mind.

The structural aspect of the alternate set up and/or process envisions an endless conveyor 300 in the form of a belt which may be formed of Teflon or like material and dimensionwise will be of a width suitable for accommodating the maximum width of article to be produced on the line and entrained around oppositely-disposed drums 302 and 304 at each end of the line, one of the drums being driven at a constant speed rate by the usual belt drive 306, which speed will be correlated to the speed of the operational units of the line to allow a precise control over the quantity of mix material to be felted onto the moving belt in any given area, it, of course, being understood that the belt drive is controllable as from a control station (not shown) by any usual means for effecting instant starting and stopping at indexed points of the belt travel.

The belt is tensioned by conventional tensioning devices 310 and is supported upwardly as by a frame work 308 to allow upper and lower horizontally-extending reaches of the belt, all whereby the mixes charged onto the upper surface of the upper reach may be carried laterally therealong in the direction of arrow r on a continuous stop-and-go basis for the positioning of the forming mat in seriatim at the plurality of stations of the line.

A web of resin-impregnated base paper or papers 312, serving as the base or backing of the finished product, is unrolled from a base paper roll 314 mounted adjacent the forward end of the belt for disposition upon and travel with the belt, being passed thereto over paper drive rollers 316 and under a pinch roll 318, the web being fed continuously onto the upper reach surface at a speed equal to that of the belt travel.

At opposite sides of and upon the belt, in parallelism as to each other, elongate side edge retaining walls 320 are provided, each comprising an outwardly-facing horizontal web and a vertically-extending upstanding web unitary therewith at the inboard side thereof. Same will be adjustably positionable with respect to the belt thereby to allow variations in positioning so as to accommodate to the forming of units of various sizes.

The upper surface of the upper reach of the belt and the opposed faces of the upstanding webs cooperantly define a matrix for the forming of the continuous mat.

Suitable mixes of wood flour and resin are felted onto the base paper in four stages along the line, the first three such stages being constituted by fixed felters disposed over and above the belt, and the fourth such stage being constituted by a reciprocating felter having a rectilinear forward and rearward travel in a transverse direction with respect to the travel of the belt therebelow.

The first felting station, for the felting of a base fines mix, is constituted by a felter 330 which is held in fixed position with respect to a line by means of a hanger 332 vertically-depending from an overhand framework 333 so as to be suspended over and centrally of the belt for effecting delivery of mix onto the belt and between the side edge retaining walls.

Felter 330 comprehends an uppermost open topped hopper with inwardly tapering side walls 334, the hopper opening to an agitator within an intermediate felter section defined by parallel straight side walls 336 unitary with respective side walls 334. Vertically below the agitator, within a lower felter section defined by inwardly-inclined and curving side walls 338 unitary with respective side walls 336, is the shaft-mounted felting rotor driven through a suitable train connecting to a drive motor all within motor, and gear drive housing 342.

A special feature of the felting procedure at this first station is the allowance of a felting, at the opposite side edges of the matrix adjacent the side edge retaining walls, of relatively greater amounts of mix so as to provide, at the elongated side edges of the mat, quantities of the mix which may serve to constitute in the order of approximately one half of the respective side edge portions of the finally felted strata. That is, additional to the layer of base fines mix being felted over the entirety of the matrix area for the forming of the lower product surface, predetermined quantities of the same mix can be felted down, so as to constitute commencement of the side edge "building" procedure. Any portion (say ½, or ¼, or ⅛, or ¾ of the total of the felting required for the "building" of the side edge procedure may be accomplished at this station and in this point of time in the program, the balance of the said "building" following in a subsequent felting operation, as will appear. And to this end, the felting rotor of said first station felter may be readily modified by simple rotor segment replacements so as to allow an arrangement of rotor segments such as is exemplified, for example, in the rotor, diagrammatically shown in FIG. 28, wherein the rotor segments having larger volume feed pockets are located at the opposite side edges of the rotor wherewith to effectuate the felting of the predetermined larger quantities of the mix at the said side edges. In that connection, again with reference to the rotor of FIG. 28, attention is called to the fact that the intermediate rotor segments therebetween are similar in configuration representing feed pockets of similar and smaller quantity, all wherewith to obtain the felting of an even layer of mix in this operation where the felter per se is stationary, while the rotor thereof is rotative upon its horizontal axis, and the belt is moved longitudinally below and therepast, thus to effect the felting of a continuous mat of the mix.

The moving belt then effects movement of the thus felted mat to operative position below a second fixed felter 352 suspended via a hanger 353, and which is similar in design and function to felter 330 wherefore its structure requires no general elaboration except to note that it functions to felt the core mix over the previously felted base fines mix. In order best to accomplish this, and in order best to preclude the felting of core mix in the areas of the previously felted portions of the side edge mix, the endmost rotor segments of the rotor thereof may be readily interchanged with full segment plugs such as shown in connection with FIG. 8 wherewith to block off same and preclude any felting thereby.

The moving belt then carries the thus felted mat to operative position below a third fixed felter 356 suspended as by a hanger 357, which felter is similar in design and function to felter 330, and which at this station serves to effect a felting of a mix of surface fines evenly over the totality of the matrix area and additionally to effect a felting of the same mix but in relatively greater quantities at the said side edges so as to compensate for the lower depth of felting at the side edges of the mat and thus to felt the balance (the other ½, or ¾, or ⅔, or ¼, as the case may be) of the side edge portions of the fines mix, all whereby the totality of the thickness felted mat will have been laid down so as to constitute a mat which is even in thickness throughout its entire area.

The belt then passes under a conventional levelling mechanism 358 wherewith the mat on the belt is leveled.

At the next-following transversely-movable felter 360, the belt is momentarily stopped, by the provided time control means, so as to first allow spaced pairs of channel gates or "cookie cutters" 362 to be dropped downwardly through and transversely of the so-formed mat with the lower edges thereof coming to rest upon the belt and thus insuring complete mat penetration. The gates of each pair operate in spaced parallelism as to each other, each pair being positioned with respect to the mat, each pair being located at an opposite end of what is subsequently to comprise a formed panel. That is, one pair of gates functions at one end of the being-formed product and one pair functions at the opposite end thereof, the distance therebetween being variable as by simple adjustment of the pairs so as readily to adapt the equipment to the forming of panels of any desired dimensions.

With the "cookie-cutters" now in operative positions, the sequence of events calls for the operation of rams 364, hydraulically or pneumatically served within cylinders 366, which cylinders are so mounted with respect to the framework as to allow movement of the rams horizontally and transversely of the belt wherewith to effect an ejection, from within the gate confines in the case of each pair of gates, of that portion of the mix of the mat so confined therebetween. The ejection is transversely of the belt to one side of the frame when the so-ejected material is captured within a strategically-located mix-recovery collecting means 368 and, returnably via a connecting conduit 369, to suitable screening apparatus (not shown) for the logical core and fines recovery procedures.

Channel clearances having been effected, moving felter 360 then is caused to move transversely of the belt to fill the so-formed channel areas with mixes of end edge fines to a depth to match the depth of the adjoining mat, thereafter the pairs of channel gates being retracted upwardly and away from the mat so as to signal resumption of belt movement for advance of the mat to the next following station.

Felter 360 is suspended by means of a vertically-depending support shaft 370 from a drive unit comprising a variable speed brake motor 372 driving a gear train 374 for driving the felter rectilinearly in opposite directions (arrow t) transversely of the belt. The gear train is a speed reducing chain drive 374 and connects to a drive shaft 378 mounting a pair of drive gears 380 and a pair of nylon wheels 382 engageable respectively with gear tracks 384 and planar tracks 386 mounted upon hanger 376.

Felting of the channelled areas with the end edge fines having been completed, and the pairs of channel gates having been retracted, the belt carries the mat to another pressure roller type of levelling mechanism 390 so as to allow a precompressing action before passage of the belt with its load through a suitably heated tunnel 392, such as of an infra-red type, there to remain for a total time of approximately three minutes under temperatures approximating 220–240° F., such heating being adequate for initiating resin activation, yet not such as to "kick over" or cure the resin.

Upon emergence from the tunnel, the heated mat is again precompressed by another pressure roller type of levelling mechanism 394, and therefollowing, surface decorative protective papers 396 are applied in pre-indexed unit positions, reflective in each instance of that position at which a unit area will come to a halt within the next following high pressure press 400.

The closing of the press, with two or three or four such unit areas therein (depending upon the selected unit size), causes the die 402 of the upper platen 404, formed of a non-conductive material such as epoxy, ceramic or the like, to cookie cut by means of cauls 406, the unit from the mat and to enclose this area and the mass between the die section and belt and the lower platen 408 while being compressed to final thickness under a pressure of between 800 and 1000 p.s.i.

Preferentially, but not obligatorily, the press will incorporate an RF circuit wherein the circuit is so energized that the formed units are rapidly compressed and cured, high frequency radio waves having been found to offer the best means for achieving the requisite rapid curing within a 3 minute cycle.

Upon pressure release followed by press opening, the cured units are carried by the belt to the end of its upper reach whence they are transferred to a conveyor and carried to a cooling "lock-up" station whereat each unit is enclosed in a steel restraining frame until cooled to a temperature of under 180° F. so as to preclude warpage or twisting in the finished unit due to trapped gas or vapor pockets.

Figure 25:
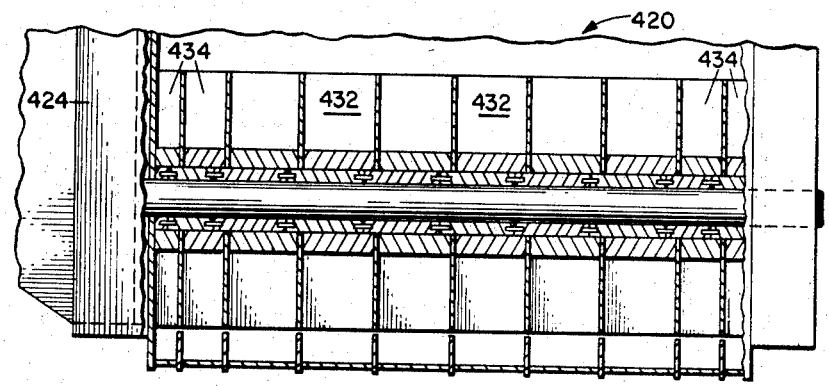
FIG. 25 is a fragmentary view, in side elevation, with parts broken away for clarity, showing a modified form of felter adapted for the felting of rectangular units within the FIG. 1 or FIG. 21 processing lines.

In FIG. 25, a modified form of felter rotor 420 is shown which may be used in the felting of rectangular units, same being seen to be comprised of relatively wide rotor segments 432 intermediate the shaft and relatively narrow rotor segments 434 at its opposite ends for special layup situations.

Figure 28:
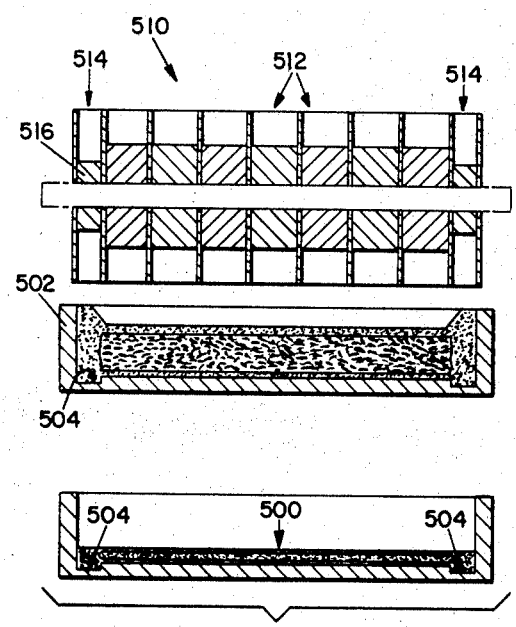
FIG. 28 is a view, in section, illustrating a method of felting a drop-edge style of article in the case of a reciprocating felter.

In FIG. 28 is shown a rotor 510 for the felting of such as a drop-edge style of end product 500 wherein the product, as formed in the rectangular matrix 502, is thicker at its opposite side edges (and possibly at its opposite end edges) than it is inboard thereof. In this application, the matrix is so configured with an outermost depression 504 in its bottom wall area as to allow for the drop-edge effect in the end product. Accordingly, in the felter rotor, the series of inboard rotor segments 512 are of equal volume and the outerboardmost rotor segment 514 at each end is of a decreased width and, because of the smaller plug 516 of an increased volume all wherewith to allow a felting of greater quantities of the mix at the narrowed edges of a rectangular application.

Figure 29:
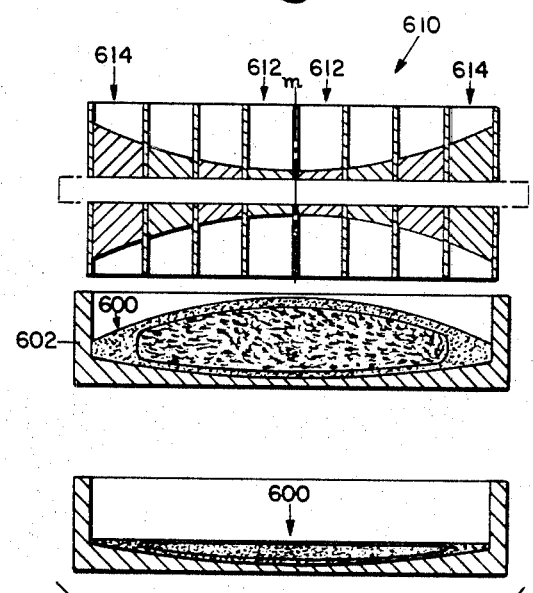
FIG. 29 is a view, in section, illustrating a method of felting an article of uneven thickness.

In FIG. 29 is shown diagrammatically a method of felting a structure 600 of uneven thickness showing the product being formed in the rectangular mold 602 wherein the product being formed in the specially configured mold is thicker at the central area than at the side edges, the special filling rotor 610 being of a design having rotor segments 612 of greater volume at the central area and rotor segments 614 of lesser volume at the opposite ends.

With reference again to the pre-press subassembly shown in FIG. 9, I have shown in FIGS. 10 and 11 a matched form of round upper platen 216 for use therewith and illustrating the feature of a ring add-on wherein an annular edge ring 217 may be secured to the upper platen as by lock bolts 219 or similar devices, for accommodating the platen to larger-than-normal sizes of matrices.

With reference back to the hot stock press in the FIG. 1 line, I have shown, in FIGS. 12 and 13, the upper platen 241 of said press as being modified so as to allow a swinging edge 243 on each of two opposite edges thereof, being swingably mounted with respect thereto as by hinge means 245, wherewith the planar operating surface of the platen may be varied for accommodating the pressing of larger than normal molds.

It need also be mentioned, with respect to a rotating felter, that same may be rotated on a vertical axis other than one located at one end of the felter as in the FIGS. 3–7 felter. For instance, it is entirely conceivable that a felter could be rotated on a vertical axis centrally of the felter, such as an axis as indicated by the line $m$ in the case of the felter in FIG. 29.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example.

The embodiments of the invention in which an exclusive property or privilege is claimed are defined as follows:

1. In a felting structure for discharging metered quanta of a particle material into predetermined zones of a receiving member positioned vertically therebelow, the combination of:
   (a) a support,
   (b) a driven gravity-discharge rotor casing mounted on the support and including spaced opposite side and end walls and an uppermost material-receiving casing entrance and a lowermost material-discharging casing exit,
   (c) drive means for motivating the casing in a horizontal plane relative to the support and to the receiving member therebelow for uniformly distributing the material in said zones;
   (d) a driven rotor rotative on a horizontal axis within the casing intermediate the casing entrance and casing exit and including a rotor shaft and a plurality of axially-aligned rotor sections mounted in adjacency on the rotor shaft with each rotor section having a filler plug circumscribing the rotor shaft and a plurality of spaced radially-extending walls disposed transversely of the plug and a circular dividing plate for defining a plurality of circumferentially arranged open-ended material-receiving pockets,
   (e) the size of the plug of each rotor section determining the load capacities of the respective material-receiving feed pockets, and
   (f) the rotating movement of the rotor effecting receipt through the casing entrance of a measured quantity of the material into each feed pocket of each rotor section and the discharge of the mixture from the feed pockets through the rotor casing exit.

2. In the felting structure according to claim 1, the casing being mounted on the support for rotation about a fixed vertical axis of the support-casing connection.

3. In the felting structure according to claim 1, the casing being mounted on the support for reciprocation on a horizontal axis.

4. In the felting structure as set forth in claim 2, the material-holding capacities of the pockets of the rotor sections increasing uniformly from the end adjacent the vertical axis toward the end distantly of the vertical axis for discharging upon rotative movement of the rotor volumes of increasing quantities of material as the linear distance away from the vertical axis and along the length of the rotor increases.

5. In the felting structure as set forth in claim 2, the material receiving capacities of the pockets of the rotor sections decreasing uniformly from the plane of the vertical axis toward the opposite ends distantly of the vertical axis for discharging upon rotative movement of the rotor volumes of decreasing quantities of material as the linear distance away from the vertical axis and along the length of the rotor increases.

6. In the felting structure as set forth in claim 1, synchronizing means for synchronizing of the speed of movement of the casing with the speed of rotation of the rotor.

7. In the felting structure as set forth in claim 3, the material-holding capacities of the pockets of the rotor sections varying according to the quantities of material desired to be deposited therebelow.

8. In a felting structure for discharging metered quanta of a particle material into predetermined zones of a matrix positioned vertically therebelow, the combination of:
   (a) a support,
   (b) a driven gravity-discharge rotor casing mounted on the support for rotation about a fixed vertical axis of the support-casing connection disposed centrally of and over the matrix and including spaced opposite side and end walls and an uppermost material-receiving casing entrance and a lowermost material-discharging casing exit,
   (c) a driven rotor mounted for rotation on a horizontal axis within the casing intermediate the casing entrance and casing exit and including a rotor shaft and a plurality of axially-aligned rotor sections mounted on the rotor shaft and each rotor section having a central plug and a plurality of spaced radially-extending walls disposed transversely of the plug and a circular dividing plate for defining a plurality of circumferentially arranged open-ended material-receiving pockets,
   (d) the dimensions of the plug of each rotor section determining the load capacity of the respective material-receiving feed pockets, and
   (e) the rotating movement of the rotor effecting receipt through the casing entrance of a measured quantity of the mixture into each feed pocket of each rotor section and the discharge of the mixture from the feed pockets through the rotor casing exit.

9. In the felting structure as set forth in claim 8, the rotor sections being spaced at points along a line parallel to and upwardly of a radius of the matrix with the width of a rotor section defining a circumferential path as the casing rotates on the fixed vertical axis with the pocket volume being greatest in the case of the rotor section defining that circumferential path farthest from the fixed vertical axis and the pocket volume being smallest in the case of the rotor section defining that circumferential path nearest to the fixed vertical axis with the rotational motion of the casing being such that each rotor section defines its own circular path about the fixed vertical axis with a different velocity with such velocities increasing directly with the linear distance from the fixed vertical axis wherewith to control the volume of the distributed particle material of a rotor section directly proportional to the respective circumference of the path defined by that rotor section.

10. In a felting structure for discharging metered quanta of a particle material into predetermined zones of a matrix positioned vertically therebelow, the combination of:
   (a) a frame,
   (b) a driven gravity-discharge rotor casing mounted on the frame for reciprocation along a horizontal axis with respect to the frame and the matrix being served and including opposite side and end walls and an uppermost material-receiving casing entrance and a lowermost material-discharging casing exit,
   (c) a driven rotor mounted for rotation on a horizontal axis within the casing intermediate the casing entrance and casing exit and including a rotor shaft and a plurality of axially-aligned rotor sections mounted on the rotor shaft and each rotor section having a central capacity-controlling plug and a plurality of spaced radially-extending walls disposed transversely of the plug and a circular dividing plate for defining a plurality of circumferentially-arranged open-ended material-receiving pockets,
   (d) the dimensions of the plug of each rotor section controlling the load capacity of the respective material-receiving feed pockets, and (e) the rotating movement of the rotor being adapted to effect receipt through the casing entrance of a measured quantity of the mixture into each feed pocket of each rotor section and the discharge of the mixture from the feed pockets through the rotor casing exit.

References Cited

UNITED STATES PATENTS

| | | | |
|---|---|---|---|
| 1,400,668 | 12/1921 | Draver | 222—273 |
| 1,938,423 | 12/1933 | Greer | 222—274 |
| 2,799,432 | 7/1957 | Suppiger et al. | 222—273 X |
| 2,942,761 | 6/1960 | Jungmayr | 222—168 X |

ROBERT B. REEVES, Primary Examiner

H. S. LANE, Assistant Examiner

U.S. Cl. X.R.

222—368